United States Patent [19]

Matsushita

[11] Patent Number: 4,951,794
[45] Date of Patent: Aug. 28, 1990

[54] ELECTROMAGNETIC CLUTCH WITH A STRUCTURE WHICH IS SIMPLE IN ASSEMBLY

[75] Inventor: Takashi Matsushita, Isesaki, Japan

[73] Assignee: Sanden Corporation, Gunma, Japan

[21] Appl. No.: 323,810

[22] Filed: Mar. 15, 1989

[30] Foreign Application Priority Data

Mar. 15, 1988 [JP] Japan .............................. 63-33100[U]

[51] Int. Cl.⁵ .............................................. F16D 27/06
[52] U.S. Cl. .................................................... 192/84 C
[58] Field of Search ...................... 192/84 R, 84 C, 90

[56] References Cited

U.S. PATENT DOCUMENTS 4,227,600 10/1980 Shirai .................................. 192/84 C

FOREIGN PATENT DOCUMENTS 2156013 10/1985 United Kingdom .............. 192/84 C

*Primary Examiner*—Rodney H. Bonack
*Assistant Examiner*—Nicholas Whitelaw
*Attorney, Agent, or Firm*—Banner, Birch, McKie & Beckett

[57] ABSTRACT

In an electromagnetic clutch for selectively transmitting rotation of a pulley to a drive shaft having an armature by magnetic force attracting the armature to the pulley, the pulley is mounted by a bearing on a tubular support projecting from a side wall of a mount and an electromagnetic device is mounted through a supporting plate on the mount for generating a magnetic force to attract the armature to the pulley. In order to make assembly of the clutch easy, the supporting plate supports the electromagnetic device at an outer peripheral region on one surface and comprises a central boss projecting from the surface and extending around the tubular support to have a projecting end, an annular surface region in contact with the side surface of the mount, and a radial inner flange radially inwardly extending from the projecting end to form a central hole through which the tubular support extends. The bearing has an axial end in press contact with the radial inner flange and an opposite axial end engaging a snap ring fitted in a snap ring receiving groove of the tubular support, to thereby prevent the bearing and the supporting plate from moving in an axial direction on the tubular support between the side wall of the mount and the snap ring.

4 Claims, 2 Drawing Sheets

ELECTROMAGNETIC CLUTCH WITH A STRUCTURE WHICH IS SIMPLE IN ASSEMBLY

BACKGROUND OF THE INVENTION (1) Field of the Invention

The present invention relates to electromagnetic clutches used for transmitting rotation from one, for example, a pulley rotated by an automative engine, to another, for example, a drive shaft of an automative air conditioning compressor.

(2) Description of the Prior Art

Such an electromagnetic clutch comprises an armature plate mounted on a first rotatable member, a second rotatable member having an electromagnetic friction surface and rotatably supported by a bearing on a mount, and an electromagnetic device mounted by a supporting plate on the mount for generating a magnetic force to attract the armature plate to the electromagnetic friction surface to enable transmission of rotation between the first and the second rotatable members, as is disclosed in, for example, U.S. Pat. No. 4,227,600 (Reference 1) issued to SHIRAI, and assigned to SANKYO ELECTRIC COMPANY, LIMITED, GB-A-2156013 (Reference 2) by SANDEN CORPORATION, and others.

In such electromagnetic clutches, the electromagnetic device and the bearing are required to be firmly supported on the mount without unintended vibration during rotation of the pulley for reliable operation of the clutch and without any axial movement of the electromagnetic device and the second rotatable member even when the electromagnetic device is energized. Further, it is required that the second rotatable member and the electromagnetic device are readily and simply mounted on the mount for assembling the clutch.

SUMMARY OF THE INVENTION

Therefore, it is an object of the present invention to provide an electromagnetic clutch which is simple in structure and is easy in assembly.

As described above, an electromagnetic clutch comprises a first rotatable member, an armature plate mounted on the first rotatable member, a mount comprising a wall and a cylindrical support frontwardly projecting from the wall, a second rotatable member having a magnetic friction surface and rotatably mounted on the cylindrical support through a bearing, stopper means fixed on the cylindrical support to stop the bearing from frontwardly moving on the cylindrical support, and electromagnetic means mounted through a supporting plate on the mount for generating a magnetic attraction force to attract the armature to the magnetic friction surface to thereby enable rotation transmission between the first and the second rotatable members. According to the present invention, the supporting plate comprises an annular region in contact with the wall of the mount, a central boss frontwardly projecting and extending around the cylindrical support to have a projecting end, and a radial inner flange radially inwardly extending from the projecting end to form a central hole through which the cylindrical support extends. The bearing has an axial end in press contact with the radial flange, whereby the bearing and the supporting plate are maintained on the cylindrical support without axial movement by the wall and the stopper means.

The supporting plate may be made of tool steel such as SK5 in JIS. In that case, the radial inner flange of the supporting plate is preferably formed with angularly-spaced radial cutaway portions to generate elasticity of the radial inner flange.

DESCRIPTION OF A PREFERRED EMBODIMENT

Prior to the description of an embodiment of the present invention, known electromagnetic clutches will briefly be described with reference to FIGS. 1 and 2.

Figure 1:
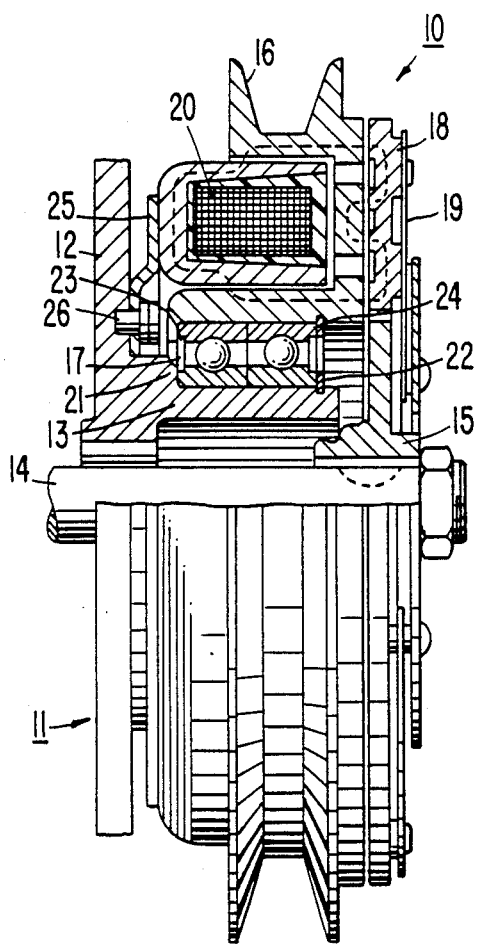
FIG. 1 is a partially exploded side view of a known electromagnetic clutch.

Referring to FIG. 1, in the electromagnetic clutch 10 shown therein is one disclosed in Reference 1, which is mounted on a mount 11 having a side wall 12 and a cantilevered tubular extension or support 13 frontwardly projecting therefrom. Through the tubular extension, a rotatable shaft 14 extends as a first rotatable member to an outside extended end on which a hub 15 is non-rotatably mounted.

The electromagnetic clutch 10 is mounted and assembled on the mount 11 and the shaft 14 so as to selectively transmit to the shaft 14 rotation from a power source (not shown).

The electromagnetic clutch 10 comprises a pulley 16 rotatably mounted as a second rotatable member by an antifriction bearing 17 on the tubular extension 13, an armature 18 supported on the hub 15 by leaf springs 19, and an electromagnetic device 20 supported on the mount 11 for selectively generating a magnetic attraction force.

The pulley 16 is made of a magnetic material and has a magnetic frictional surface opposite to the armature 18 through a small gap. The pulley 16 is driven by the power source such as an automotive engine through a V-belt (not shown). When the electromagnetic device 20 is energized to produce a magnetic force, the armature 18 is attracted to the magnetic frictional surface of the pulley 16 against the spring force by the leaf springs 19. Thus, the armature 18 and, therefore, the shaft 14 are rotated together with the pulley 16.

In order to ensure presence of the small gap between the pulley 16 and the armature 18, it is required that the pulley 16 be mounted on the tubular extension 13 without axial movement. To this end, the tubular extension 13 has a collar portion to form a shoulder 21 against which a rear side end of the bearing 17 is attached while a front side end being attached against a snap ring 22 fitted in a groove formed in an outer surface of the tubular extension 13. Thus, the bearing 17 is mounted on the tubular extension 13 without axial movement. The bearing 17 is also fixed to an inner bore of the pulley 16 without axial relative movement by an inwardly extending flange 23 and snap ring 24.

In order to fixedly support the electromagnetic device 20 without axial and radial movement, the electromagnetic device 20 is supported by a supporting plate 25 which is fixed onto the side wall 12 of the mount 11 by a plurality of rivets 26.

In this structure, it is very difficult to fix the supporting plate 25 by rivets 26 onto the side wall 12 of the mount 11 in assembling the electromagnetic clutch 10 because the rivet 26 is inserted through a small annular space defined between the electromagnetic device 20 and the tubular extension 13 to be affixed to the side wall 12.

Figure 2:
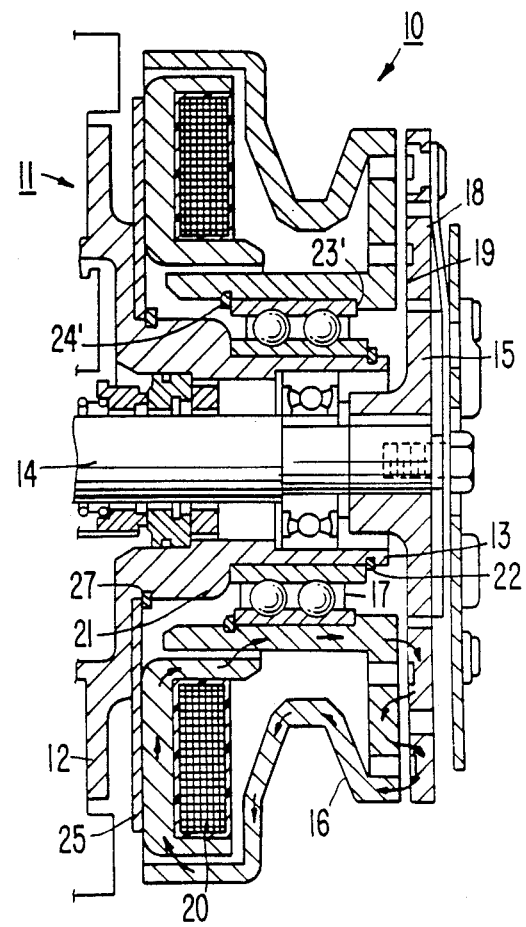
FIG. 2 is a vertical sectional view of another known electromagnetic clutch.

Referring to FIG. 2, another known electromagnetic clutch is shown which is a type disclosed in Reference 2. The electromagnetic clutch has a structure similar to the structure shown in FIG. 1. The similar parts are represented by the same reference numerals as in FIG. 1 and description thereto is omitted for the purpose of simplification of the description.

The known electromagnetic clutch of FIG. 2 is different from that of FIG. 1 in the shape of the pulley 16 and the electromagnetic device 20, in arrangement of a flange 23' and a snap ring 24' for fixing mounting of the bearing 17 to the pulley 16, and in fixture of the supporting plate 25 to the mount 11. A snap ring 27 is used for fixing the supporting plate 25 onto the mount 11.

In this structure, it is also difficult to fit the supporting plate 25 to the mount 11 because the snap ring 27 must be fitted into a receiving groove through a small annular space defined between the electromagnetic device 20 and the tubular extension 13.

In order to resolve this problem in assembling the electromagnetic clutch on the mount, neither rivets nor a snap ring is used for mounting the supporting plate 25 according to the present invention.

Figure 3:
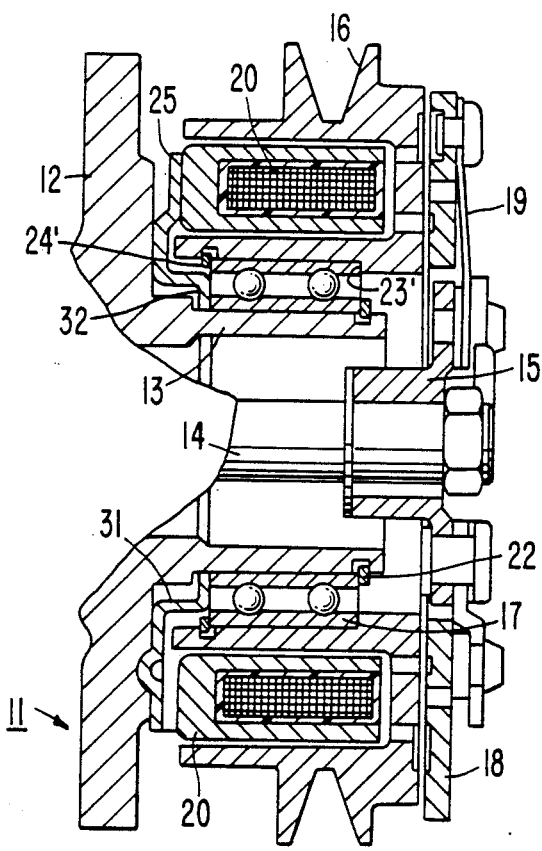
FIG. 3 is a vertical sectional view of an electromagnetic clutch according to one embodiment of the present invention.
Figure 4:
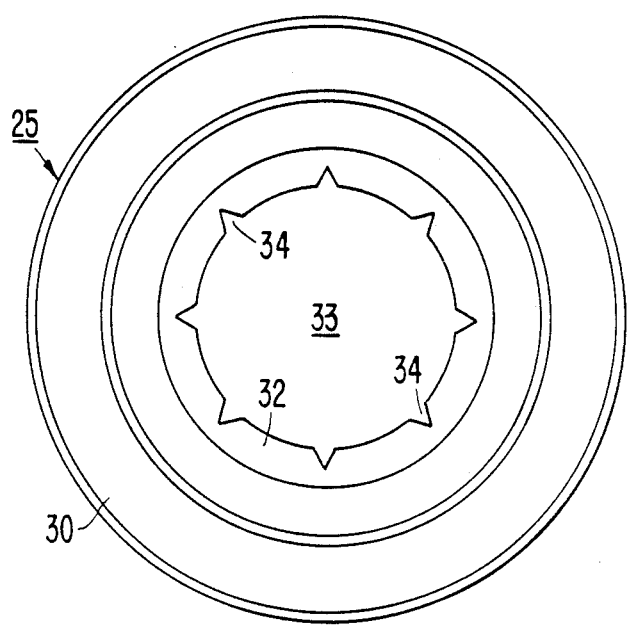
FIG. 4 is a front view of a supporting plate for an electromagnetic device in the clutch of FIG. 3.

Referring to FIGS. 3 and 4, the electromagnetic clutch shown therein is one according to an embodiment of the present invention and is fundamentally similar to those shown in FIGS. 1 and 2 and similar parts are represented by the same reference numerals and description thereto is omitted herein for the purpose of simplification of the description As will be seen from comparison with FIGS. 1 and 2, the electromagnetic clutch shown in FIG. 3 is different from the known ones in a structure of the supporting plate 25.

Referring to FIG. 4 additionally, the supporting plate 25 is a circular plate having a central boss 31 projecting from one surface thereof. The central boss 31 has a predetermined axial length and a bore larger than an outer diameter of the tubular extension 13. The supporting plate 25 is further provided with a radial inner flange 32 radially inwardly extending from a projecting end of the boss 31. The radial inner flange defines a central hole 33 having a diameter substantially equal to the outer diameter of the tubular extension 13.

The electromagnetic device 20 is joined or fixedly mounted by, for example, welding on an outer peripheral region 30 on the side surface with the boss 31.

The supporting plate 25 with the electromagnetic device 20 is mounted on the mount 11 by inserting the tubular extension 13 through the central opening 33 and the bearing 17 is then also fitted onto the tubular extension 13. Then, the snap ring 22 is fitted in the similar manner as in the prior art. Thus, the bearing 17 is between the radial inner flange 32 of the supporting plate 25 and the snap ring 22 and is prevented from axial movement thereby.

The supporting plate 25 is urged onto the side wall 12 by reaction force generated between the radial inner flange 32 and the rear end of the bearing 17, to thereby fixedly mount the supporting plate 25 onto the mount 11.

According to the embodiment as described above, the supporting plate 25 is only fitted on the tubular extension 13 and is fixedly supported on the mount 11 by subsequent mounting operation of the bearing 17 and snap ring 22. Therefore, it will be noted that the supporting plate is readily mounted on the mount 11 in the assembling operation of the electromagnetic clutch.

The supporting plate 25 is preferably made of tool steel such as SK5 by JIS (Japanese Industrial Standards) which is generally corresponding to WI-8 in ASTM (American Society for Testing and Material). In that case, the radial inner flange 32 may be provided with a plurality angularly-spaced radial cutaway portions 34 so as to generate elasticity to the radial flange 32. Therefore, assembly becomes easier because the snap ring 22 is readily fitted onto a snap ring receiving groove in the tubular extension 13 after the supporting plate 25 and the bearing 17 are fitted on the tubular extension 13.

This invention has been described in detail in connection with preferred embodiments, but these are examples only and this invention is not restricted thereto. It will be easily understood by those skilled in the art that the other variations and modifications can be easily made within the scope of this invention.

What is claimed is:

1. An electromagnetic clutch which comprises a first rotatable member, an armature plate mounted on the first rotatable member, a mount comprising a wall and a cylindrical support frontwardly projecting from the wall, a second rotatable member having a magnetic friction surface and rotatably mounted on the cylindrical support through a bearing, stopper means fixed on the cylindrical support to stop the bearing from frontwardly moving on the cylindrical support, and electromagnetic means mounted through a supporting plate on the mount for generating a magnetic attraction force to attract the armature to the magnetic friction surface to thereby enable rotation transmission between the first and the second rotatable members, wherein said supporting plate comprises an annular region being in contact with the wall of the mount, a central boss frontwardly projecting and extending around said cylindrical support to have a projecting end, and a radial inner flange radially inwardly extending from the projecting end to form a central hole through which said cylindrical support extends, said bearing having an axial end in press contact with said radial flange, whereby said bearing and said supporting plate are maintained on the cylindrical support without axial movement by the wall and the stopper means.

2. An electromagnetic clutch as claimed in claim 1, wherein said supporting plate is made of tool steel.

3. An electromagnetic clutch as claimed in claim 2, wherein said tool steel is SK5 in JIS.

4. An electromagnetic clutch as claimed in claim 2, wherein said radial inner flange of said supporting plate is formed with angularly-spaced radial cutaway portions to generate elasticity of said radial inner flange.

* * * * *